United States Patent
Pintard

[11] 3,811,714
[45] May 21, 1974

[54] CORNER ADAPTORS FOR EXPANSION JOINTS

[75] Inventor: Frederick Bruce Pintard, Somerville, N.J.

[73] Assignee: Johns-Manville Corporation, New York, N.Y.

[22] Filed: Apr. 24, 1972

[21] Appl. No.: 246,615

[52] U.S. Cl. .................. 285/229, 285/236, 285/424
[51] Int. Cl. ............................................. F16l 51/02
[58] Field of Search .......... 285/224, 225, 226, 227, 285/228, 229, 235, 236, 424

[56] References Cited
UNITED STATES PATENTS

| | | | |
|---|---|---|---|
| 2,354,045 | 7/1944 | Nystrom et al. ................. | 285/235 X |
| 3,593,502 | 7/1971 | Pelosi.............................. | 285/236 X |
| 1,450,826 | 4/1923 | Walten............................ | 285/424 X |
| 2,578,140 | 12/1951 | Krupp et al...................... | 285/225 X |
| 3,305,251 | 2/1967 | Skinner............................ | 285/229 |
| 3,647,247 | 3/1972 | Pintard et al. ................... | 285/229 |
| 3,712,650 | 1/1973 | Mez.................................. | 285/424 |

Primary Examiner—Mervin Stein
Assistant Examiner—David H. Corbin
Attorney, Agent, or Firm—Robert M. Krone; James W. McClain

[57] ABSTRACT

A corner adaptor for a frameless flexible expansion joint comprises inner and outer complementary members adapted to be secured together and to a corner of a duct. A corner of the expansion joint boot is received between the inner and outer members and is secured thereto whereby each corner adaptor positions, reinforces, seals, supports and secures a corner of the boot to a corner of the duct. Intermediate the corner adaptors, clamping bars secure the boot directly to the duct to complete the connection of the boot to the duct. The corner adaptor accommodates both flat belt boots and molded corner boots.

11 Claims, 8 Drawing Figures

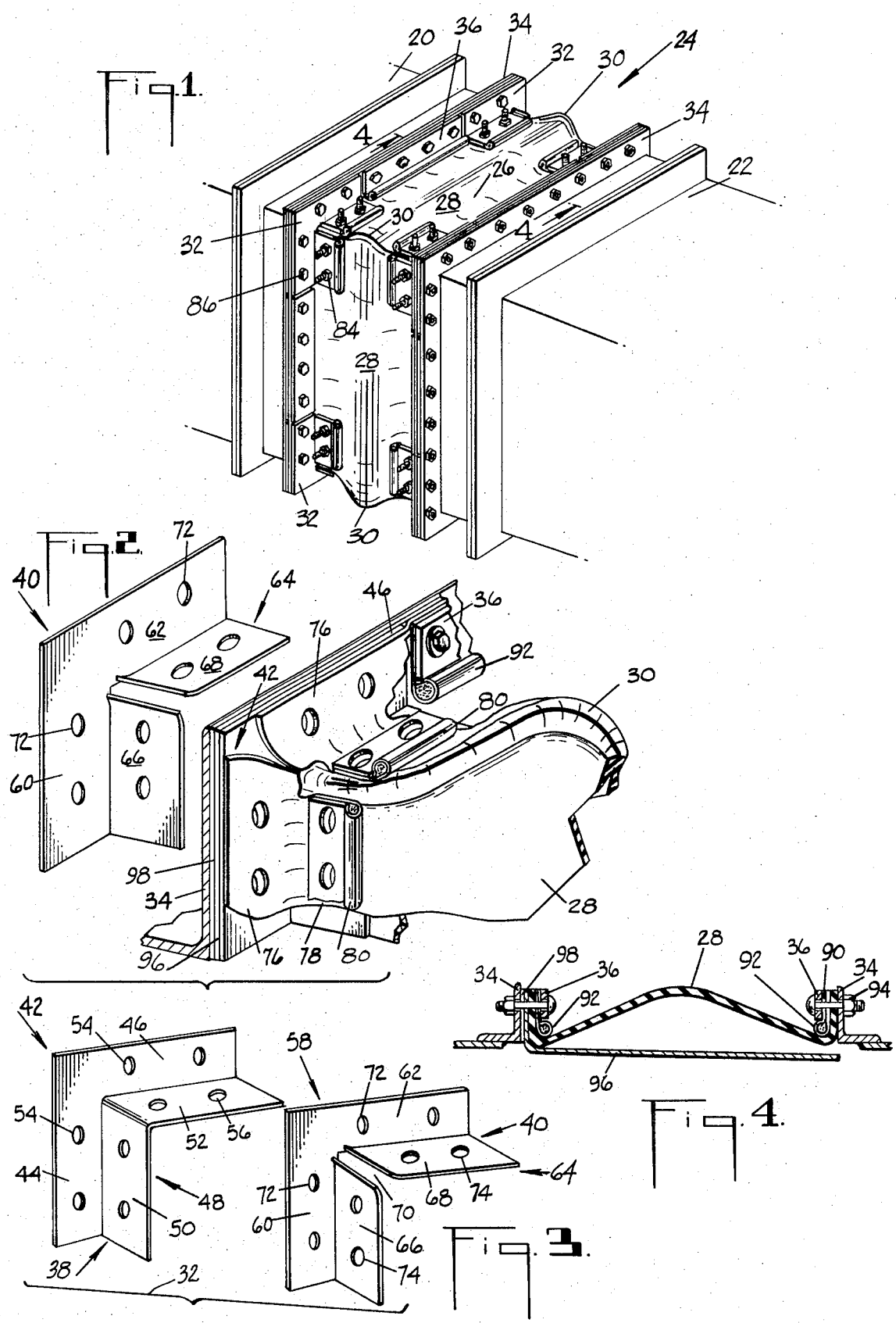

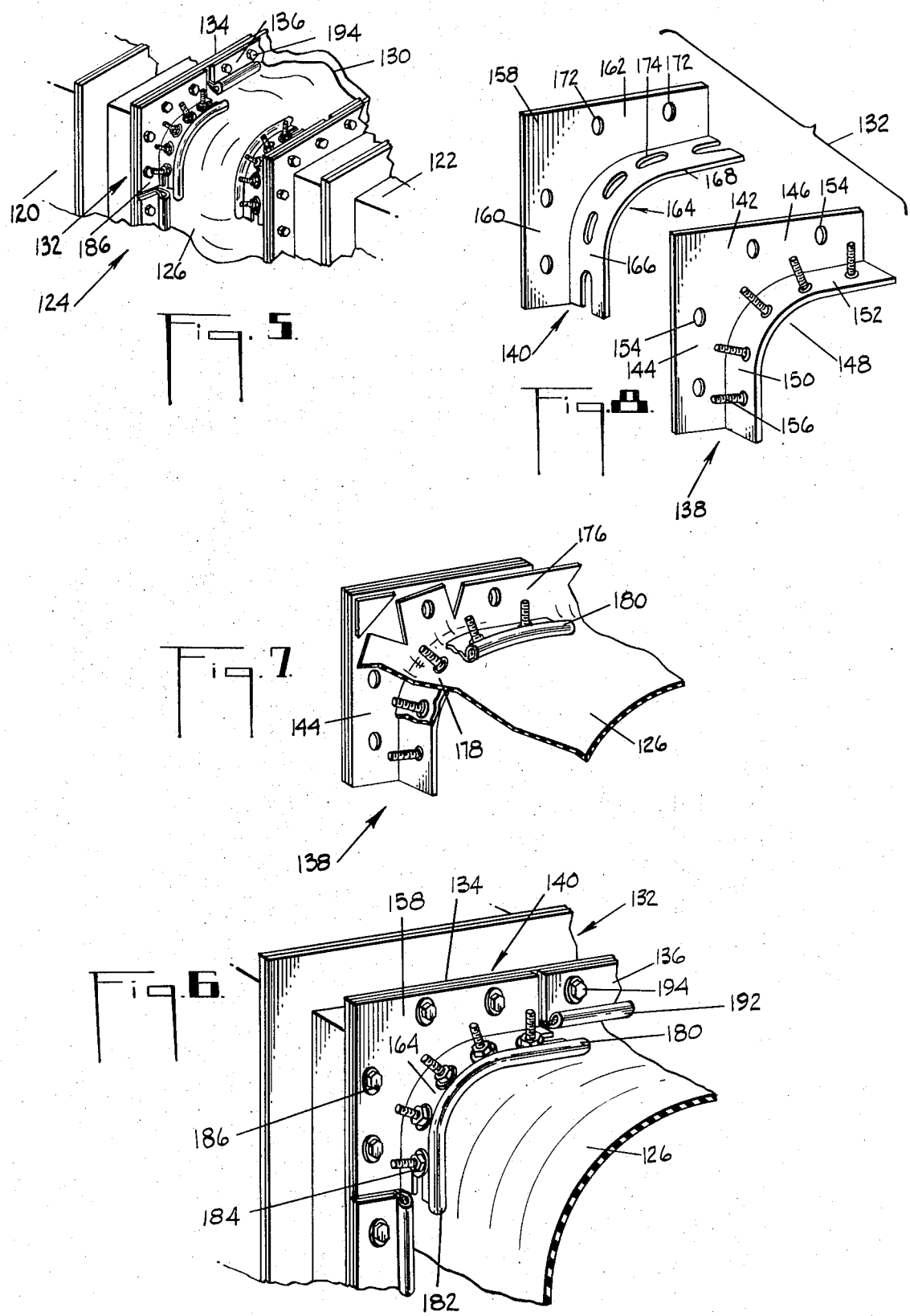

CORNER ADAPTORS FOR EXPANSION JOINTS

BACKGROUND OF THE INVENTION

The present invention relates to corner adaptors for expansion joints, frameless flexible expansion joint boots provided with such corner adaptors and the joints formed with the corner adaptors.

In a duct work system there is a need to compensate for the thermal expansion and contraction of the duct work and axial misalignment of duct sections. For large size duct work e.g. duct work having a peripheral dimension of up to 50 feet and more, flexible frameless expansion joints have been utilized to both compensate for the thermal expansion and contraction of the duct work and axial misalignment of duct sections being joined by the expansion joints. These frameless flexible expansion joints generally employ either a molded corner boot or a flat belt boot. Obviously the peripheral dimensions of these boots equal those of the duct sections being joined with the boots typically being one to two feet in length and having a peripheral flange at each end up to one foot in width for facilitating the connection of the boot to existing duct work.

The molded corner boot is made up of four pieces of flexible, heat resistant, fluid impermeable material which are molded together so as to form a boot of generally rectangular cross section with molded longitudinal corner seams. In use these boots are subjected to severe mechanical stresses and strains which have resulted in boot failures. The failures have been particularly serious at the molded boot corners adjacent the ends of the boots causing gas leakage and the like. Consequently, the need has arisen to provide a means for connecting the boots to the existing duct work which will position, reinforce, seal and support the corners of these boots to prevent the failures which previously occurred when attempting to utilize this type of boot.

The flat belt boot is typically made of a single piece of flexible, heat resistant, fluid impermeable material. The ends of the piece are molded together to form a boot with a longitudinally extending seam adapted to be located intermediate corner portions of the boot. With this type of boot the need has arisen to provide a means for connecting the boots to existing duct work which will position, seal and support the corners of the boot.

Consequently, it is the object of the present invention to provide a corner adaptor which will position, reinforce, seal, support and secure the corners of flexible boots to existing duct work. It is a further object to provide an adaptor which is inexpensive yet durable.

SUMMARY OF THE INVENTION

Accordingly the present invention provides a corner adaptor for securing a corner of a frameless flexible expansion joint to a corner of a duct. The corner adaptor comprises inner and outer members wherein the outer member nests with the inner member. Both members have a mounting plate which has a configuration substantially the same as that of the corner of the duct. Projecting outwardly at right angles from the inner edge of each of the mounting plates is a flange made up of two portions which lie in planes oriented at an angle to each other. A corner of the boot is received between the flanges and extends outwardly between the mounting plates. The corner of the boot is firmly secured between the flanges in sealing engagement therewith. Fastening means are then passed through the mounting plates and the peripheral edges of the boot to further secure the boot to the adaptor and to secure the adaptor to the duct work. To complete the joint between the boot and the duct, clamping bars extend between the corner adaptors with fastening elements passing through the clamping bars, the edges of the boot, and the flange on the duct to secure the intermediate portions of the boot to the duct.

BRIEF DESCRIPTION OF THE DRAWINGS

FIG. 1 is a perspective view of a duct system employing the corner adaptors of the present invention to secure the corners of a frameless flexible expansion joint to the corners of adjacent ducts;

FIG. 2 is an enlarged exploded perspective view of a corner of the assembly shown in FIG. 1 with the outer element of the corner adaptor removed and a portion of the boot broken away to better show the manner in which the boot is secured to the corner adaptor;

FIG. 3 is an exploded view in perspective of the inner and outer members of the corner adaptor;

FIG. 4 is a longitudinal view taken substantially along lines 4—4 of FIG. 1 to illustrate a typical cross section of the joints intermediate the corner adaptors;

FIG. 5 is a fragmentary perspective view of a duct system similar to that of FIG. 1 and employing a frameless flexible expansion joint provided with a second embodiment of the corner adaptor;

FIG. 6 is an enlarged perspective view of one corner of the assembly shown in FIG. 5 to better illustrate the construction of the corner adaptor;

FIG. 7 is an enlarged perspective view of the same corner shown in FIG. 7 with the outer element of the corner adaptor removed and portions of the boot broken away to better show the manner in which the boot is secured to the corner adaptor; and FIG. 8 is an exploded perspective view of the inner and outer elements of the second embodiment of the corner adaptor.

DETAILED DESCRIPTION OF THE INVENTION

FIGS. 1 through 3 illustrate a first embodiment of the present invention. In FIG. 1, duct sections 20 and 22 are connected by a frameless flexible expansion joint 24. The expansion joint 24 comprises a boot 26 made up of four panels 28 of a flexible resilient material which panels are joined at seams 30 into a generally rectangular tubular configuration. The flexible material of the boot is typically a flexible but substantially resilient and formable rubber sheet material such as rubberized fabric; however, boots made of sheet materials other can also be secured to ducts with the corner adaptor of the present invention. The seams 30 are typically bonded or molded seams wherein the adjacent edges of the panels are bonded or molded together to form the tubular expansion joint. U.S. Pat. No. 3,647,247 entitled Tubular Connection for Expansion Joints and issued March 7, 1972 discloses one type of frameless flexible expansion joint which can be secured to a duct by means of the corner adaptor 32 of the present invention.

The boot 26 is joined to the peripheral flanges 34 at the ends of the duct sections 20 and 22 by means of the corner adaptors 32 and the clamping bars 36. As shown in FIG. 3 the corner adaptors 32 comprise an inner member 38 and an outer member 40. The inner and outer members are complementary with the outer member 40 being nested with the inner member 38 when the adaptor is assembled.

The inner member 38 comprises a mounting plate 42 which has the same general configuration as the corner of the duct to which it is joined. For a rectangular duct the plate 42 comprises two portions 44 and 46 which extend at substantially right angles to each other in a common plane whereby the plate has a generally L-shaped configuration. Projecting at right angles from an inner edge to plate 42 is a flange 48 having first and second portions 50 and 52 extending at right angles to each other in planes extending at right angles to each other. Mounting plate 42 is provided with a plurality of apertures 54 which are positioned in the plate so as to be axially aligned with apertures in the flange 34 of the duct section 20 or 22. Flange 48 is provided with either apertures 56 which are axially aligned with apertures in the outer member 40 when the elements are assembled or studs which are aligned with slots in the outer member 40.

Outer member 40 comprises a mounting plate 58 having portions 60 and 62 extending perpendicular to each other in the same plane, whereby the plate has a generally L-shaped configuration. A flange 64 extends at right angles with respect to mounting plate 58 along an inner edge of plate 58. The flange 64 is made up of portions 66 and 68 which extend at right angles to each other. A gap 70 is provided intermediate flange portions 66 and 68 at the juncture of the inner edges of plate portions 60 and 62. This gap is provided to allow the molded seam 30 of the boot 26 to project through the outer member 40 of the adaptor to facilitate the securement of the boot to the adaptor in sealing engagement. Apertures 72 are provided in plate 58. These apertures are aligned with the apertures provided in plate 42 of the inner member and the apertures in the duct flange 34 when the corner adaptor is assembled. Apertures 74 are provided in flange 64 which apertures are aligned with the apertures 56 in flange 48. In the event that studs are provided on flange 48 rather than apertures 56, flange 64 must be provided with elongated slots so that the outer member 40 can be nested in the inner member 38 without the studs interfering with the placement of the outer member in the inner member.

Turning now to FIG. 2 the mounting of the corner adaptor 32 on the boot 26 and the securement of the boot 26 to the duct flange 34 by means of the corner adaptor 32 is illustrated in detail. As shown in FIG. 2 the edge portion of the boot 26 overlays the inner member 38 of the corner adaptor with the marginal flange 76 being folded up to lie in contact with plate 42 while an adjacent portion 78 of the boot overlays flange 48. Tadpole strips 80 are superimposed upon portion 78 of the boot. The outer member 40 is superimposed upon the marginal flange 76 of the boot and the tadpole strips 80 with the beads of the tadpole strips extending along the exposed edge of flange 64 to prevent the flange from damaging the boot during operation. Bolt and nut assemblies 84 secure flange 48 to flange 64 while also passing through the boot portion 78 and the tadpole strips 80 to retain the tadpole strips 80 and boot between flanges 48 and 64. By drawing the nuts down into tight engagement with the outer flange 64 the boot is firmly clamped between flanges 64 and 48 to effect a good seal between the boot and the corner adaptor. In addition, the seam 30 is reinforced and held together at its end to prevent boot failure in this previously critical area.

Bolt and nut assemblies 86 pass through mounting plates 42 and 58 of the corner adaptor apertures in the marginal flange 76 of the boot, and the duct flange 34. The bolt assemblies help to retain the boot in the corner adaptor and to effect a better seal between the boot and corner adaptor. In addition, the bolts serve to secure the corner adaptor 32 and consequently the corner of the boot to the duct in sealing engagement therewith.

As shown in FIG. 4 clamping bars 36 are provided to secure the marginal flange 76 of the boot directly to the flange 34 of the duct intermediate the corner adaptors 32. The clamping bars comprise elongate elements with a generally rectangular cross section and apertures 90 therein which are located to be in alignment with the apertures located in the flange 34 of the duct. Tadpole strips 92 are located intermediate the clamping bars and the marginal flange 76 of the boot with the bead of the tadpole strips being located underneath the clamping bars to protect the material of the boot from wear caused by movement of the boot relative to the clamping bars 36. Bolt and nut assemblies 94 pass through the clamping bar 36, tadpole strips 92, the marginal flange 76, and the duct flange 34 to secure the boot in sealing engagement with the flange 34 of the duct intermediate the corner adaptors. As shown in FIG. 4 when a metal baffle 96 is provided an additional gasket 98 is required between the baffle and the duct flange to effect the seal.

FIGS. 5 through 8 illustrate a second embodiment of the present invention. In FIG. 5 duct section 120 is connected to duct section 122 by means of an expansion joint 124. Expansion joint 124 comprises a boot 126. Boot 126 is made up of a single sheet or belt of flexible material which has a longitudinally extending seam 130 located intermediate a pair of the corners of the boot. The corner adaptor 132 secures the corners of the boot to end flange 134 of the duct. The clamping bars 136 extend intermediate the corner adaptors to secure the boot to the flange 134 intermediate the corners of the boot.

The corner adaptor 132 comprises an inner member 138 and an outer member 140. The inner and outer members are complimentary with respect to each other and the outer member is nested with the inner member when the adaptor 132 is assembled. The inner member 138 is made up of a mounting plate 142 having the general configuration of the corner of the duct flange 134. As shown, for a rectangular duct, the plate 142 has a first portion 144 and a second portion 146 which extend at substantially right angles with respect to each other in a common plane whereby the plate has a generally L-shaped configuration. A flange 148 extends substantially perpendicular to plate 142 along an inner edge thereof. Flange 148 is made up of first and second flange portions 150 and 152 which extend at right angles to each other in planes extending at right angles to each other. Flange portions 150 and 152 are connected by a rounded portion whereby the flange 148 has a generally arcuate configuration. Mounting plate 142 is provided with apertures 154 which are located in the plate so as to be axially aligned with apertures in the duct flange 134. Flange 148 is either provided with studs 156 which project outwardly from the outer face of the flange or apertures can be provided in the flange if separate bolt assemblies are used.

Outer member 140 comprises a mounting plate 158 having the same general L-shaped configuration as mounting plate 142 of the inner member with portion 160 of the plate oriented at right angles to portion 162 of the plate in a common plane. Flange 164 extends substantially perpendicular to mounting plate 158 along the inner edge of plate 158. The flange 164 has a generally arcuate configuration with the extreme portions 166 and 168 of the flange being oriented substantially perpendicular with respect to each other. Apertures 172 are provided in flange 158. These apertures are axially aligned with apertures 154 in mounting plate 142 when the members are assembled. Flange 164 is provided with a series of slots 174 which are adapted to receive the studs 156 mounted on flange 148 when the corner adaptor is assembled. Of course if the studs 156 are not utilized on flange 148 of inner member 138, aligned apertures can be provided in flanges 148 and 164 to receive separate bolt and nut assemblies.

Turning now to FIGS. 6 and 7 the connection of the corner adaptor 132 to the duct and the manner in which the boot is secured to the corner adaptor 132 is shown in detail. As shown in FIG. 7 the edge of the boot overlays the plate 142 and flange 148 of the inner member with the marginal flange 176 of the boot extending along plate 142 while the adjacent portion 178 overlays flange 148. As best shown in FIG. 6 the outer member 140 is superimposed upon the inner member 138 with the edge of the boot and a tadpole strip 180 interposed between the members. The tadpole strip 180 is placed over boot portion 178 and extends from one end of flange 164 to the other end of flange 164 with the bead 182 of the tadpole running along the exposed edge of flange 164 to prevent the flange from damaging the boot during operation. Nuts 184, which are placed on studs 156, are tightened down to firmly secure and clamp the boot in sealing engagement within the corner adaptor. Bolt and nut assemblies 186 pass through the apertures 172 in the outer member, apertures in the marginal flange portion 176, apertures 154 in the inner member and corresponding apertures in the duct flange 134 to secure the corner adaptor 132 to the duct flange.

Intermediate the corner adaptors clamping bars 136 are utilized to secure the boot directly to the flange 134 of the duct. The assembly is identical to that shown in cross section in FIG. 4 wherein the marginal flange portion 176 of the boot is in direct contact with the duct flange 134 with a tadpole strip 192 interposed intermediate the boot 126 and the clamping bar 136. The bead of the tadpole strip 192 runs along the bottom of the bar to separate the clamping bar 136 from the boot material so that the bar cannot damage the material during expansion and contraction of the expansion joint. Bolt and nut assemblies 194 pass through apertures in the clamping bar, the tadpole strip, the boot, and the flange 134 to secure the clamping bar and consequently the boot to the duct flange. Where a baffle is utilized it is interposed between the margin of the boot and the duct flange 134 with a sealing strip being included to assure that an effective seal is maintained for the assembly.

While the preferred embodiments of the invention have been described in connection with rectangular ducts it is to be understood that the corner adaptors could also be utilized for ducts of other polygonal cross sections having three, four, five, six and even more sides. Obviously the configuration of the mounting plates and the angle of the flanges relative to each other would have to be altered to coincide with the angular relationship between adjacent sides of the duct. While bolt and nut or stud and nut assemblies have been shown as the fastening means for the embodiments of the present invention it is anticipated that other conventional fastening means could be substituted for these fastening means where desired.

What we claim is:

1. A corner adapter for securing a corner of a frameless flexible expansion joint boot having corner seams therein to a corner of a duct comprising:

a. an inner member; said inner member having a mounting plate adapted to abut and be secured to said corner of said duct, said mounting plate having first and second portions extending at an angle with respect to each other substantially equal to the angle of said corner of said duct; said inner member also having a flange extending from said mounting plate at substantially right angles thereto, said flange having first and second portions angularly related with respect to each other at the same angle as that between said first and second portions of said mounting plate;

b. an outer member adapted to nest with said inner member; said outer member having a mounting plate adapted to be secured to said corner of said duct, said mounting plate having first and second portions extending at an angle with respect to each other substantially equal to the angle of said corner of said duct; said outer member also having a flange extending at substantially right angles thereto, said flange having first and second portions angularly related with respect to each other at the same angle as that between said first and second portions of said mounting flange of said outer member; said flange also having a transverse gap between said first and second portions thereof to permit said corner seam of said boot to extend therethrough; and c. means securing said inner member to said outer member.

2. The corner adaptor as defined in claim 1 wherein said first and second portions of each of said flanges lie in planes substantially perpendicular to each other.

3. The corner adaptor as defined in claim 2 wherein said mounting plates each have first and second portions extending at substantially right angles with respect to each other whereby said mounting plates have an L-shaped configuration.

4. The corner adaptor as defined in claim 3 wherein said flanges extend from inner edges of said mounting plates.

5. A frameless flexible expansion joint for a duct system comprising:

a. at least one corner adapter for securing a corner of a flexible boot to a corner of a duct, said corner adapter comprising:

1. an inner member; said inner member having a mounting plate adapted to abut and be secured to said corner of said duct, said mounting plate having first and second portions extending at an angle with respect to each other substantially equal to the angle of said corner of said duct; and said inner member also having a flange extending from said mounting plate at substantially right angles thereto, said flange having first and second portions angularly related with respect to each other at the same angle as that between said first and second portions of said mounting plate;

2. an outer member adapted to nest with said inner member; said outer member having a mounting plate adapted to be secured to said corner of said duct, said mounting plate having first and second portions extending at an angle with respect to each other substantially equal to the angle of said corner of said duct; said outer member also having a flange extending at substantially right angles thereto, said flange having first and second portions angularly related with respect to each other at the same angle as that between said first and second portions of said mounting flange of said outer member; said flange also having a transverse gap between said first and second portions thereof to permit said corner seam of said boot to extend therethrough;

b. a boot of flexible material, said boot having at least one corner with a seam therein, said corner lying between said flanges of respectively said inner and outer members and said seam extending through said gap between said first and second portions of said flange of said outer member; and c. means to secure said inner member, said boot and said outer member together.

6. The frameless flexible expansion joint of claim 5 wherein there are a plurality of corner adaptors, with each of said corner adaptors having a corner of said boot secured thereto.

7. The frameless flexible expansion joint as defined in claim 5 wherein said first and second portions of each of said flanges lie in planes substantially perpendicular to each other.

8. The frameless flexible expansion joint as defined in claim 7 wherein said mounting plates each have first and second portions extending at substantially right angles with respect to each other whereby said mounting plates have an L-shaped configuration.

9. The frameless flexible expansion joint as defined in claim 8 wherein said flanges extend from inner edges of said mounting plates.

10. A duct system including a frameless flexible expansion joint comprising:

a. a duct having a peripheral flange at one end;
b. a boot of flexible material having corners each with a seam therein;
c. corner adapter securing said corners of said boot to the corners of said peripheral flange of said duct, said corner members each comprising:
 1. an inner member; said inner member having a mounting plate adapted to abut and be secured to said corner of said duct, said mounting plate having first and second portions extending at an angle with respect to each other substantially equal to the angle of said corner of said duct; said inner member also having a flange extending from said mounting plate at substantially right angles thereto, said flange having first and second portions angularly related with respect to each other at the same angle as that between said first and second portions of said mounting plate;

2. an outer member adapted to nest with said inner member; said outer member having a mounting plate adapted to be secured to said corner of said duct, said mounting plate having first and second portions extending at an angle with respect to each other substantially equal to the angle of said corner of said duct; said outer member also having a flange extending at substantially right angles thereto, said flange having first and second portions angularly related with respect to each other at the same angle as that between said first and second portions of said mounting flange of said outer member; said flange also having a transverse gap between said first and second portions thereof to permit said corner seam of said boot to extend therethrough; and d. means to secure said corner adapter and said boot to said peripheral flange of said duct, with each corner of said boot lying between the flanges of, respectively, the inner and outer members of said corner adapter, and the seam of said corner extending through the gap in the flange of said outer member of said corner adapter.

11. A joint as defined in claim 10 wherein intermediate said corner adaptors said boot is secured directly to said duct flange by means of clamping bar assemblies.

* * * * *

PO-1050
(5/69)

UNITED STATES PATENT OFFICE
CERTIFICATE OF CORRECTION

Patent No. 3,811,714        Dated May 21, 1974

Inventor(s) Frederick B. Pintard et al

It is certified that error appears in the above-identified patent and that said Letters Patent are hereby corrected as shown below:

Inventor should read --Frederick Bruce Pintard, Somerville, N.J. and John Kazmierski, Jr., Ringoes, N.J.-- instead of "Frederick Bruce Pintard, Somerville, N.J."

Signed and sealed this 12th day of November 1974.

(SEAL)
Attest:

McCOY M. GIBSON JR.        C. MARSHALL DANN
Attesting Officer        Commissioner of Patents